United States Patent [19]
Dahlman et al.

[11] Patent Number: 5,991,330
[45] Date of Patent: Nov. 23, 1999

[54] MOBILE STATION SYNCHRONIZATION WITHIN A SPREAD SPECTRUM COMMUNICATION SYSTEMS

[75] Inventors: Erik Dahlman, Bromma; Maria Gustafsson, Stockholm, both of Sweden; Riaz Esmailzadeh, Kawasaki, Japan

[73] Assignee: Telefonaktiebolaget L M Ericsson (publ), Stockholm, Sweden

[21] Appl. No.: 08/884,002

[22] Filed: Jun. 27, 1997

[51] Int. Cl.$^6$ .................................................. H04B 15/00
[52] U.S. Cl. .......................... 375/200; 375/209; 375/316; 370/509; 370/510
[58] Field of Search ..................................... 375/200, 206, 375/207, 367, 209, 354, 343, 365, 316; 370/320, 335, 342, 441, 479, 350, 512, 509, 491, 510

[56] References Cited

U.S. PATENT DOCUMENTS

| | | | |
|---|---|---|---|
| 4,943,974 | 7/1990 | Motamedi . | |
| 5,410,568 | 4/1995 | Schilling | 375/205 |
| 5,734,648 | 3/1998 | Adachi et al. | 370/342 |
| 5,778,316 | 7/1998 | Persson et al. | 455/434 |
| 5,793,757 | 8/1998 | Uddenfeldt | 370/335 |
| 5,805,583 | 9/1998 | Rakib | 370/342 |

FOREIGN PATENT DOCUMENTS

| | | |
|---|---|---|
| 0 744 840 | 5/1996 | European Pat. Off. . |
| WO 93/15573 | 8/1993 | WIPO . |

OTHER PUBLICATIONS

PCT International Search Report, Oct. 9, 1998, PCT/SE 98/01138.

*Primary Examiner*—Chi H. Pham
*Assistant Examiner*—Emmanuel Bayard
*Attorney, Agent, or Firm*—Jenkens & Gilchrist, P.C.

[57] ABSTRACT

Each frame of a pilot channel transmission in a spread spectrum communications system is divided into a plurality of synchronization slots. Each of the synchronization slots includes a pilot code, and at least one of the synchronization slots further includes a framing synchronization code. To extract frame and slot synchronization information from the pilot channel transmission, pilot code timing is first identified by applying a matched filter or correlation to a received pilot signal, identifying peaks, and using the peaks to find a timing reference indicative of synchronization slot boundaries. Next, the set of known framing synchronization codes are correlated with the received signal over the included found synchronization slots. Given that the location within the frame of the known framing synchronization code(s) is known, once a correlation match is found at a certain slot location, the boundary of the frame (i.e., the frame synchronization) relative thereto is then also known.

17 Claims, 2 Drawing Sheets

MOBILE STATION SYNCHRONIZATION WITHIN A SPREAD SPECTRUM COMMUNICATION SYSTEMS

BACKGROUND OF THE INVENTION

1. Technical Field of the Invention

The present invention relates to spread spectrum communications systems and, in particular, to timing synchronization of a mobile station with a base station in a spread spectrum communications system.

2. Description of Related Art

The cellular telephone industry has made phenomenal strides in commercial operations throughout the world. Growth in major metropolitan areas has far exceeded expectations and is outstripping system capacity. If this trend continues, the effects of rapid growth will soon reach even the smallest markets. The predominant problem with respect to continued growth is that the customer base is expanding while the amount of electromagnetic spectrum allocated to cellular service providers for use in carrying radio frequency communications remains fixed. Innovative solutions are required to meet these increasing capacity needs in the limited available spectrum as well as to maintain high quality service and avoid rising prices.

Currently, channel access is primarily achieved using Frequency Division Multiple Access (FDMA) and Time Division Multiple Access (TDMA) methods. In frequency division multiple access systems, a communication channel comprises a single radio frequency band into which the transmission power of a signal is concentrated. In time division multiple access systems, a communications channel comprises a time slot in a periodic train of time intervals over the same radio frequency. Although satisfactory performance is being obtained from FDMA and TDMA communications systems, channel congestion due to increasing customer demand commonly occurs. Accordingly, alternate channel access methods are now being proposed, considered and implemented.

Spread spectrum comprises a communications technique that is finding commercial application as a new channel access method in wireless communications. Spread spectrum systems have been around since the days of World War II. Early applications were predominantly military oriented (relating to smart jamming and radar). However, there is an increasing interest today in using spread spectrum systems in communications applications, including digital cellular radio, land mobile radio, and indoor/outdoor personal communication networks.

Spread spectrum operates quite differently from conventional TDMA and FDMA communications systems. In a direct sequence code division multiple access (DS-CDMA) spread spectrum transmitter, for example, a digital symbol stream at a basic symbol rate is spread to a transmit symbol rate (or chip rate). This spreading operation involves applying a user unique digital code (the spreading or signature sequence) to the symbol stream that increases its symbol rate while adding redundancy. This application typically multiplies the digital symbol stream by the digital code. The resulting transmitted data sequences (chips) are then modulated using an appropriate modulation scheme to generate an output signal. This output signal (referred to as a channel, such as a traffic channel or a pilot channel) is added to other similarly processed (i.e., spread) output signals (channels) for multi-channel transmission over a communications medium. The output signals of multiple users (channels) advantageously then share one transmission communications frequency, with the multiple signals appearing to be located on top of each other in both the frequency domain and the time domain. Because the applied digital codes are user unique, however, each output signal transmitted over the shared communications frequency is similarly unique, and through the application of proper processing techniques at the receiver may be distinguished from each other. In the DS-CDMA spread spectrum receiver, the received signals are demodulated and the appropriate digital code for the user of interest is applied (i.e., multiplied, or matched) to despread, or remove the coding from the desired transmitted signal and return to the basic symbol rate. Where this digital code is applied to other transmitted and received signals, however, there is no despreading as the signals maintain their chip rate. The despreading operation thus effectively comprises a correlation process comparing the received signal with the appropriate digital code.

Before any radio frequency communications or information transfer between a base station and a mobile station of the spread spectrum communications system can occur, the mobile station must find and synchronize itself to the timing reference of that base station. In a direct sequence code division multiple access spread spectrum communications system, for example, the mobile station must find downlink chip boundaries, symbol boundaries and frame boundaries of this timing reference clock. The most common solution implemented to this synchronization problem has the base station periodically transmit (with a repetition period $T_p$) on a pilot channel, and the mobile station detect and process, a recognizable pilot code $\bar{c}_p$ of length $N_p$ chips as shown in FIG. 1. In one type of CDMA communications system, each base station utilizes a different, known pilot code taken from a set of available pilot codes. In another type of CDMA communications system, each base station utilizes the same pilot code, with differences between base stations being identified through the use of differing phases for the transmissions.

In the spread spectrum receiver of the mobile station, the received signals are demodulated and applied to a filter matched to the pilot code(s). It is, of course, understood that alternate detection schemes, such as sliding correlation, may be used for pilot code processing. The output of the matched filter peaks at times corresponding to the reception times of the periodically transmitted pilot code. Due to the effects of multi-path propagation, several peaks may be detected relating to a single pilot code transmission. From processing these received peaks in a known manner, a timing reference with respect to the transmitting base station may be found with an ambiguity equal to the repetition period $T_p$. If the repetition period equals the frame length, then this timing reference may be used to frame synchronize mobile station and base station communications operation.

While any length of $N_p$ in chips for the transmitted pilot code $\bar{c}_p$ may be selected, as a practical matter the length of $N_p$ in chips is limited by the complexity of the matched filter implemented in the mobile station receiver. At the same time, it is desirable to limit the instantaneous peak power $\hat{P}_p$ of the pilot code signal/channel transmissions in order not to cause high instantaneous interference with other spread spectrum transmitted signals/channels. To obtain sufficient average power with respect to pilot code transmissions given a certain chip length $N_p$, it may become necessary in the CDMA communications system to utilize a pilot code repetition period $T_p$ that is shorter than a frame length $T_f$ for the pilot channel as illustrated in FIG. 2.

Another reason for transmitting multiple pilot codes $\bar{c}_p$ within a single frame length $T_f$ is to support inter-frequency downlink synchronization in the compressed mode known to those skilled in the art. With compressed mode processing, downlink synchronization on a given carrier frequency is carried out during only part of a frame rather than during (across) the entire frame. It is possible, then, with only one pilot code $\bar{c}_p$ per frame, that compressed mode processing could miss over a significant time period detecting the pilot code completely. By transmitting multiple pilot codes c during each frame, multiple opportunities per frame are given for compressed mode processing detection, and at least one pilot code transmission will be capable of detection.

There is, however, a drawback with respect to reception and synchronization experienced with multiple pilot code $\bar{c}_p$ transmission within a single frame length $T_f$. Again, the received signals are demodulated and applied to a filter (or correlator) matched to the known pilot code. The output of the matched filter peaks at times corresponding to the reception times of the periodically transmitted pilot code. From processing these peaks, a timing reference for the transmitting base station relating to the pilot code repetition period $T_p$ may be found in the manner well known in the art. However, this timing reference is ambiguous with respect to the frame timing and thus does not present sufficient information to enable base/mobile station frame synchronization to the timing reference. By ambiguous it is meant that the boundary of the frame (i.e., its synchronization) cannot be identified from the detected pilot code peaks alone. Thus, in connection with the transmission of multiple pilot codes $\bar{c}_p$ within a single frame length $T_f$, a need exists for a procedure to determine frame synchronization.

SUMMARY OF THE INVENTION

Each frame of a base station transmission within a spread spectrum communications system relating to a pilot channel is divided into a plurality of synchronization slots. Each of the synchronization slots includes a pilot code $\bar{c}_p$ transmitted with a predetermined timing offset relative to the slot boundary. At least one of the synchronization slots further includes a framing synchronization code $\bar{c}_s$ transmitted with a predetermined timing offset relative to either the slot boundary or its associated pilot code $\bar{c}_p$. The pilot code $\bar{c}_p$ and framing synchronization code $\bar{c}_s$ are preferably non-overlapping. In instances where multiple framing synchronization codes $\bar{c}_s$ are transmitted (for example, one per synchronization slot), the framing synchronization codes are unique for each slot in a frame, but are repeated in each frame. Furthermore, the multiple framing synchronization codes $\bar{c}_s$ are preferably mutually orthogonal and are preferably orthogonal to the pilot code $\bar{c}_p$.

To obtain synchronization information, a mobile station first identifies pilot code timing by applying a $\bar{c}_p$-matched filter to a received signal and identifying peaks. From these peaks, a timing reference with respect to the synchronization slot boundaries may be found using the known timing offset between the pilot code and the synchronization slot boundary. While this timing reference is ambiguous as to frame timing, knowledge of the synchronization slot boundaries indirectly points to the location of the framing synchronization code $\bar{c}_s$ in the synchronization slot. The mobile station then further correlates the set of known framing synchronization codes $\bar{c}_s$ to the received signal at the location of a framing synchronization code. Given that both the timing offset of each framing synchronization code(s) $\bar{c}_s$ location with respect to the slot boundary and the position of the slot boundary relative to the frame boundary are known, once a correlation match is found at the location, the boundary of the frame relative thereto (and hence, the frame synchronization) is then also known.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
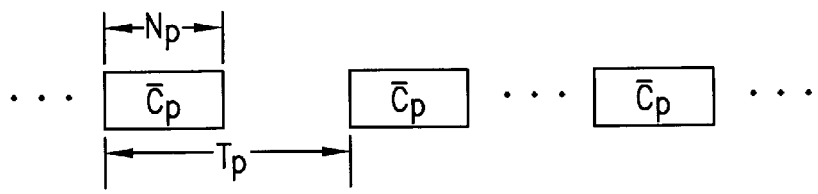
FIG. 1, previously described, is a diagram illustrating a prior art pilot channel signal transmission format in a direct sequence code division multiple access (DS-CDMA) communications system.
Figure 2:
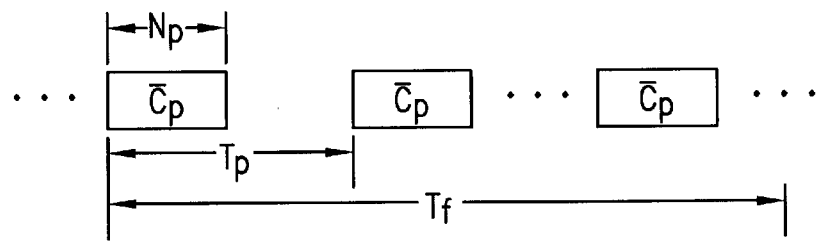
FIG. 2, previously described, is a diagram illustrating an alternate prior art pilot channel signal transmission format in a direct sequence code division multiple access communications system.
Figure 3:
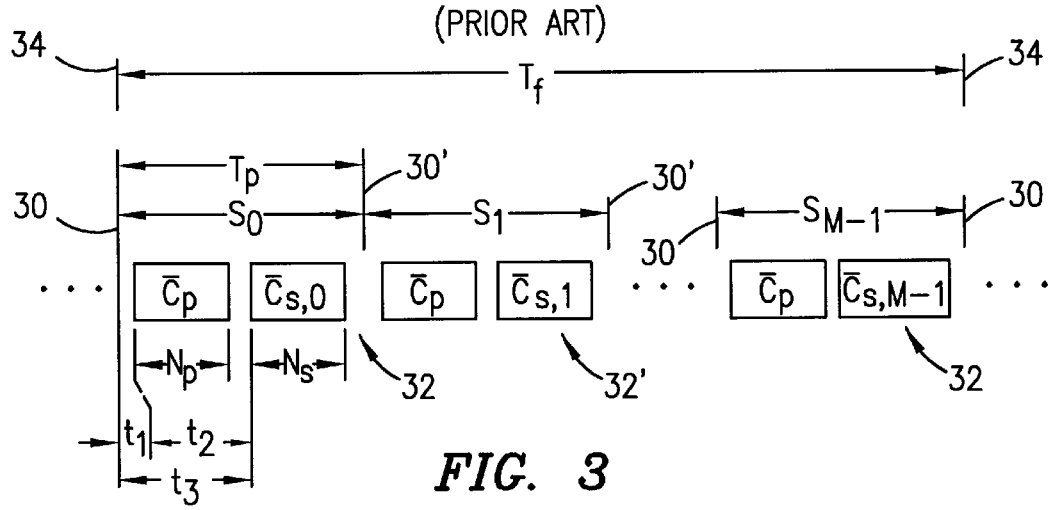
FIG. 3 is a diagram illustrating a present invention pilot channel signal transmission format in a direct sequence code division multiple access communications system.

Reference is now made to FIG. 3 wherein there is shown a diagram illustrating a present invention pilot channel signal transmission format in a spread spectrum communications system (such as a direct sequence code division multiple access communications system). Each frame having a length $T_f$ of a pilot channel transmission is divided into a plurality (M in number) of synchronization slots $s_0, s_1, \ldots, s_{M-1}$. The length of each synchronization slot s is equal to a pilot code repetition period $T_p$. Each of the synchronization slots includes a pilot code $\bar{c}_p$ and a framing synchronization code $\bar{c}_s$. The pilot code is the same in each synchronization slot and across the repeating frames. The pilot code $\bar{c}_p$ and framing synchronization code $\bar{c}_s$ are preferably non-overlapping. With the transmission of multiple (M in number) framing synchronization codes $\bar{c}_{s,0}, \bar{c}_{s,1}, \ldots, \bar{c}_{s,M-1}$ (one per synchronization slot $s_0, s_1, \ldots, s_{M-1}$), the framing synchronization codes are unique for each slot in a frame, and are repeated in each frame. Furthermore, the multiple framing synchronization codes $\bar{c}_{s,0}, \bar{c}_{s,1}, \ldots, \bar{c}_{s,M-1}$ are preferably mutually orthogonal and are preferably orthogonal to the pilot code. The pilot code $\bar{c}_p$ has a known timing offset $t_1$ with respect to a boundary 30 of the synchronization slot. The framing synchronization code $\bar{c}_s$ has a known timing offset $t_2$ with respect to its associated pilot code $\bar{c}_p$ and a known timing offset $t_3$ with respect to the boundary 30 of the synchronization slot. Furthermore, the synchronization slots have a known position relative to a frame boundary 34.

Figure 4:
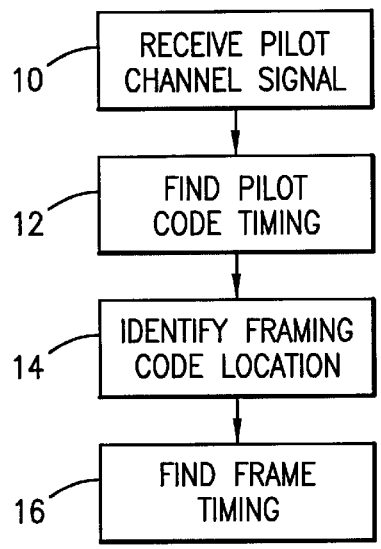
FIG. 4 is a flow diagram illustrating a process performed by a mobile station in obtaining a base station timing reference from processing a pilot channel signal transmission in the format of FIG. 3.

Reference is now made to FIG. 4 wherein there is shown a flow diagram illustrating a process performed by a mobile station in obtaining a base station timing reference from processing a received signal having the pilot channel signal transmission format of FIG. 3. In step 10, the mobile station receives a signal. Next, in step 12, the mobile station processes the received signal $\bar{s}$ to find the pilot code $\bar{c}_p$ timing (i.e., the location of the synchronization slots). This process occurs in accordance with the matched filter or correlation procedures mentioned above as is well known in the art. From the found pilot code $\bar{c}_p$ timing, the mobile station next identifies in step 14 the location(s) of the included framing synchronization code(s) $\bar{c}_s$ (in step 14). This identification of framing synchronization code $\bar{c}_s$ location naturally follows using the known timing offset $t_2$, as illustrated in FIG. 3, once the location of the synchronization slots (pilot codes $\bar{c}_p$) are found. The mobile station then processes the framing synchronization code(s) $\bar{c}_s$ (step 16) within the received signal $\bar{s}$ at the synchronization slot locations to find the frame timing (i.e., the frame boundary) utilizing the timing offset $t_2$ and/or the timing offset $t_3$ as well as the known position of the synchronization slot boundary 30 relative to the frame boundary 34.

Figure 5:
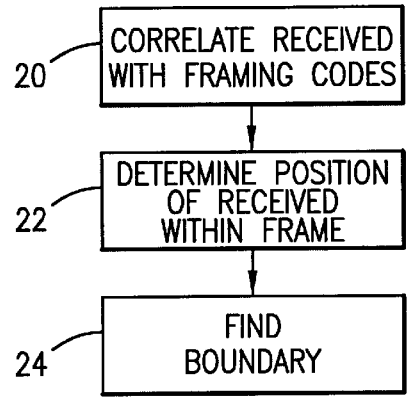
FIG. 5 is a flow diagram illustrating a process performed by a mobile station in finding frame timing (boundary) within the process of FIG. 4.

Reference is now made to FIG. 5 wherein there is shown a flow diagram illustrating a process performed by a mobile station in finding frame timing (boundary) within the process of FIG. 4 (step 16). Framing synchronization code location is already known from step 14 of FIG. 4. A portion of the received signal $\bar{s}$ at an identified framing synchronization code location (found using timing offset $t_2$) is then correlated in step 20 with the set of possible authorized framing synchronization codes $\bar{c}_{s,0}, \bar{c}_{s,1}, \ldots, \bar{c}_{s,M-1}$. This operative step may be mathematically represented by the following:

$$R_i = |\langle \bar{s}, \bar{c}_{s,i} \rangle| \quad (1)$$

wherein: $0 \leq i \leq M-1$ (i.e., over the M synchronization slots s); and $\langle \bar{a}, \bar{b} \rangle$ denotes the correlation operation.

Next, in step 22, the process determines the position within the frame of the portion of the received signal $\bar{s}$ at the identified location relative to both the slot boundary 30 and the frame boundary 34. In accordance with this operation, if $R_i$ has a maximum when i=n, then it is assumed that the portion of the received signal $\bar{s}$ at the identified location is positioned within the n-th synchronization slot s of the frame at the timing offset $t_3$. Then, in step 24, the frame timing (boundary) is found as the position of the portion of the received signal $\bar{s}$ identified as being positioned within the n-th synchronization slot s boundary 30 relative to the frame boundary 34 is known.

The correlation operation of step 20 may be carried out over several synchronization code intervals of consecutive synchronization slots. This operative step may be mathematically represented by the following:

$$R_i = \sum_{j=0}^{L-1} |\langle \bar{s}_j, \bar{c}_{s,i+j(\mathrm{mod}M)} \rangle| \quad (2)$$

wherein:

$0 \leq i \leq M-1$ (i.e., over the M synchronization slots s);

$\bar{s}_j$ are portions of the received signal at identified framing synchronization code locations of consecutive synchronization slots; L is the number of framing synchronization code intervals; and $\langle \bar{a}, \bar{b} \rangle$ denotes the correlation operation between the received signal $\bar{s}$ within the j-th framing synchronization code interval and the (i+j)-th (modM) framing synchronization code(s) $\bar{c}_s$.

Next, in step 22, the process determines the position within the frame of the portion of the received signal $\bar{s}$ at the identified location. In accordance with this operation, if $R_i$ has a maximum when i=n, then it is assumed that the portion of the received signal $\bar{s}$ at the identified location in the first interval (j=0) is positioned within the n-th synchronization slot s of the frame at the timing offset $t_3$. Then, in step 24, the frame timing (boundary) is found as the position of the portion of the received signal $\bar{s}$ identified as being positioned within the n-th synchronization slot s boundary 30 is known relative to the frame boundary 34.

A more complete understanding of the process implemented in FIGS. 4 and 5 may be obtained by reference to a specific example. Accordingly, reference is now again made to FIG. 3. The operation of step 12 applies a $\bar{c}_p$-matched filter or correlation to the received signal. The peaks found from this filtering identify synchronization slot boundaries 30 using the known timing offset $t_1$. Once these slot boundaries 30 are known, and given knowledge of the type of pilot channel formatting implemented, the location 32 of the included framing synchronization code(s) $\bar{c}_s$ is also known (step 14) using the known timing offset $t_2$. Next, the correlation operation of step 20 using either Equation (1) or Equation (2) is performed to match a portion of the received signal $\bar{s}$ at a certain one of the identified framing code locations 32' with one of the set of possible authorized framing synchronization codes $\bar{c}_{s,0}, \bar{c}_{s,1}, \ldots, \bar{c}_{s,M-1}$. From a match, a corresponding particular slot boundary 30' is identified (step 22) using the known timing offset $t_3$. Once this particular slot boundary 30' is known, and given knowledge of the matched framing synchronization code location in a given slot within the frame, the frame boundary 34 is identified (step 24).

Figure 6:
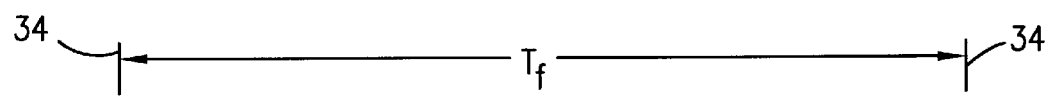
FIG. 6 is a diagram illustrating an alternate embodiment pilot channel signal transmission format in a direct sequence code division multiple access communications system.

Reference is now made to FIG. 6 wherein there is shown a diagram illustrating an alternate embodiment pilot channel signal transmission format in a direct sequence code division multiple access communications system. Each frame having a length $T_f$ of a pilot channel transmission is divided into a plurality (M in number) of synchronization slots $s_0, s_1, \ldots, s_{M-1}$. The length of each synchronization slot s is equal to a pilot code repetition period $T_p$. Each of the synchronization slots includes a pilot code $\bar{c}_p$. The pilot code is the same in each synchronization slot and across the repeating frames. One of the synchronization slots s, for example a first one of the slots $s_0$ as illustrated, in the frame is further designated to include a framing synchronization code $\bar{c}_s$. The pilot code $\bar{c}_p$ and framing synchronization code $\bar{c}_s$ are preferably non-overlapping. The pilot code $\bar{c}_p$ has a known timing offset $t_1$ with respect to a boundary 30 of the synchronization slot. The framing synchronization code $\bar{c}_s$ has a known timing offset $t_2$ with respect to the pilot code $\bar{c}_p$ and a known timing offset $t_3$ with respect to the boundary 30 of the synchronization slot. Furthermore, the synchronization slots, and in particular the designated synchronization slot, have a known position relative to a frame boundary 34.

Figure 7:
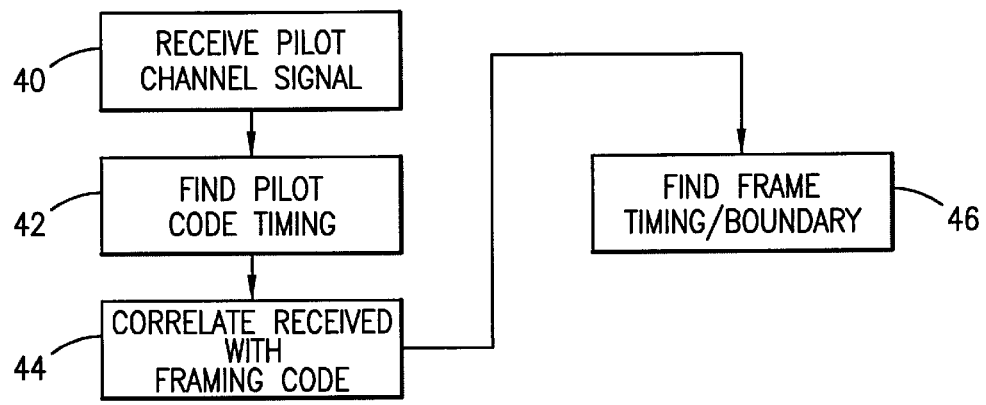
FIG. 7 is a flow diagram illustrating a process performed by a mobile station in obtaining a base station timing reference from processing a pilot channel signal transmission in the alternate format of FIG. 6.

Reference is now made to FIG. 7 wherein there is shown a flow diagram illustrating a process performed by a mobile station in obtaining a base station timing reference from processing a received signal having the pilot channel signal transmission format of FIG. 6. In step 40, the mobile station receives the pilot channel signal. Next, in step 42, the mobile station processes the received signal to find the pilot code $\bar{c}_p$ timing (i.e., the location of synchronization slots). This process occurs in accordance with the procedures described above and well known in the art and utilizes knowledge of the timing offset $t_1$. From the found pilot code $\bar{c}_p$ timing, the mobile station knows the pilot code repetition period $T_p$. Next, in step 44, M intervals of the received signal $\bar{s}$, corresponding to the possible framing synchronization code locations identified within the synchronization slots s found from the known pilot code repetition period $T_p$, are then correlated with the authorized framing synchronization code $\bar{c}_s$. This operative step may be mathematically represented by the following:

$$R_i = |\langle \bar{s}_i, \bar{c}_s \rangle| \qquad (3)$$

wherein:

$0 \leq i \leq M-1$ (i.e., over the M intervals); and $\langle \bar{a}, \bar{b} \rangle$ denotes the correlation operation.

Next, in step 46, the frame timing (boundary) is found. In accordance with this operation, if $R_i$ has a maximum when i=n, then it is assumed that the n-th portion of the received signal $\bar{s}$ is positioned at the synchronization slot s in the frame designated for the framing synchronization code (i.e., the first slot $s_0$ in the illustrated embodiment). Frame timing (boundary) is then found as the relative position to the frame boundary of the designated synchronization slot is known.

A more complete understanding of the process implemented in FIG. 7 may be obtained by reference to a specific example. Accordingly, reference is now again made to FIG. 6. The operation of step 42 applies a $\bar{c}_p$-matched filter to the received signal. The peaks found from this filtering identify synchronization slot boundaries 30 utilizing the known timing offset $t_1$. Once these slot boundaries 30 are known, and given knowledge of the type of pilot channel formatting implemented (i.e., timing offset $t_2$ and framing code position), the included framing synchronization code $\bar{c}_s$ is found using the correlation operation of step 44 and Equation (3) which matches consecutive portions of the received signal $\bar{s}$ at the M candidate locations 32 for framing synchronization codes within the identified slots with the authorized framing synchronization code $\bar{c}_s$. Once the framing synchronization code location 32 is known, and given knowledge of the matched location within the frame (e.g., timing offset $t_3$ in the first synchronization slot as shown), the frame boundary 34 is identified (step 46).

Figure 8:
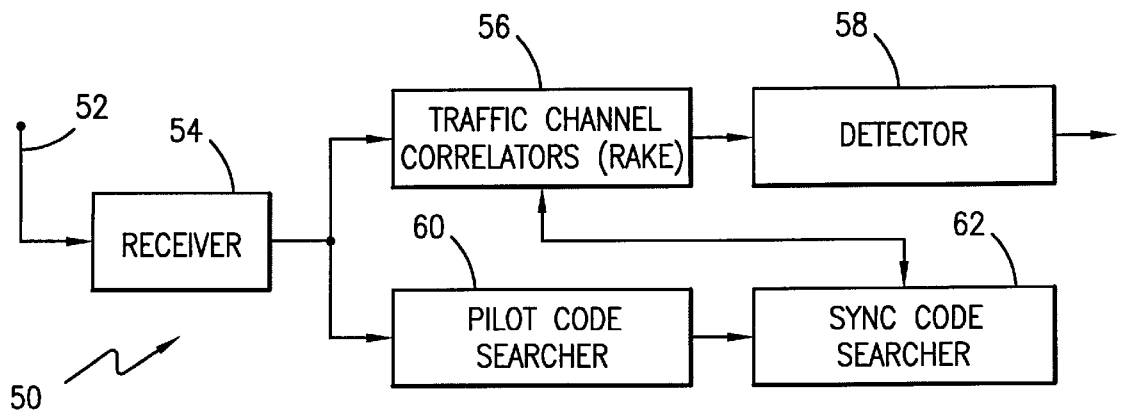
FIG. 8 is a simplified block diagram of a spread spectrum communications system receiver.

Reference is now made to FIG. 8 wherein there is shown a simplified block diagram of a spread spectrum communications system receiver 50. A receive antenna 52 collects the signal energy of a transmitted modulated spread data sequence and passes that energy to a radio receiver 54. The receiver 54 amplifies, filters, mixes, and analog-to-digital converts as necessary to convert the received radio signal to a baseband signal. The baseband signal is usually sampled at least once per chip period and may or may not be stored in a buffer memory (not shown).

The baseband signals are passed to a plurality of traffic channel correlators 56 (implementing a RAKE receiver configuration). The operational function of the correlators 56 is sometimes referred to as despreading since the correlation coherently combines the multiple spread data values back into a single informational value when a given despreading sequence is correctly time-aligned with the received sample sequence. The output correlations are provided to one or more detectors 58 which reproduce the original informational data stream. The form of detector used depends on the characteristics of the radio channel and complexity limitations. It may include channel estimation and coherent RAKE combining, or differential detection and combining, as necessary.

In the context of the present invention, the baseband signals are passed to a pilot code searcher 60 specifically designated for pilot channel processing. The pilot code searcher 60 processes the baseband signal to find the pilot code $\bar{c}_p$ timing using the known actions of applying a $\bar{c}_p$-matched filter, identifying peaks and locating a timing reference within respect to base station transmissions and then identifies the location(s) of the included framing synchronization code(s) $\bar{c}_s$ from the pilot code $\bar{c}_p$ location. This information is then passed on to a sync code searcher 62 which implements the specific pilot channel processing of the present invention by determining therefrom the frame timing (i.e., the frame boundary). The operation of the pilot code searcher 60 and sync code searcher 62 are defined by the flow diagrams of FIGS. 4, 5 and 7, as well as the Equations (1), (2) and (3). The pilot channel frame and slot timing/synchronization information generated by the pilot code searcher 60 and sync code searcher 62 is then utilized by the traffic channel correlators 56 and detector 58 in reproducing and processing the original informational data stream.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A propagated signal for a code division multiple access pilot channel transmission, comprising:

a repeating frame comprising a plurality of synchronization slots;

a pilot code $\bar{c}_p$ repeated in each synchronization slot of the repeating frame; and a framing synchronization code $\bar{c}_s$ in at least one of the synchronization slots of the repeating frame.

2. The propagated signal of claim 1 wherein the pilot code $\bar{c}_p$ and framing synchronization code $\bar{c}_s$ are non-overlapping.

3. The propagated signal of claim 1 wherein the framing synchronization code $\bar{c}_s$ if in more than one of the synchronization slots are unique per synchronization slot and are repeated in each frame.

4. The propagated signal of claim 3 wherein the pilot code $\bar{c}_p$ and individual ones of the framing synchronization codes are non-overlapping.

5. The propagated signal of claim 3 wherein the plurality of framing synchronization codes are mutually orthogonal.

6. A method for processing a signal including a pilot channel to obtain timing synchronization information, wherein the signal includes a repeating frame divided into a plurality of synchronization slots, each slot including a pilot code $\bar{c}_p$ and at least one slot including a framing synchronization code $\bar{c}_s$, comprising the steps of:

correlating a received signal to the pilot code $\bar{c}_p$ in order to find synchronization slot locations; and correlating the received signal at a location within the found synchronization slot to a set of framing synchronization code $\bar{c}_s$ in order to find frame synchronization timing information.

7. The method as in claim 6 wherein the second step of correlating comprises the step of matching the framing synchronization code $\bar{c}_s$ to a location within each of the plurality of consecutive found synchronization slot locations in the repeating frame.

8. The method as in claim 6 wherein the framing synchronization code $\bar{c}_s$ if in more than one of the synchronization slots are unique per synchronization slot, and wherein the second step of correlating comprises the step of matching the plurality of framing synchronization codes to the location within a synchronization slot.

9. The method as in claim 8 wherein the plurality of framing synchronization codes are mutually orthogonal.

10. The method as in claim 6 wherein the second step of correlating further comprises the step of identifying the frame synchronization timing information from a known relative position in the repeating frame with respect to the framing synchronization code $\bar{c}_s$.

11. The method as in claim 6 wherein the pilot code $\bar{c}_p$ and framing synchronization code $\bar{c}_s$ are non-overlapping.

12. Apparatus for processing a code division multiple access signal including a pilot channel to obtain timing synchronization information, comprising:
    a receiver for receiving a signal including a repeating frame divided into a plurality of synchronization slots, each slot including a pilot code $\bar{c}_p$ and at least one slot including a framing synchronization code $\bar{c}_s$; and
    a pilot channel searcher connected to the receiver to receive a pilot channel portion of the signal, the searcher operating to correlate a received pilot channel portion to the pilot code $\bar{c}_p$ in order to find synchronization slot locations, and correlate the received pilot channel portion at a location within the found synchronization slot to the framing synchronization code $\bar{c}_s$ in order to find frame synchronization timing information.

13. The apparatus as in claim 11 wherein the searcher operation further matches the framing synchronization code $\bar{c}_s$ to a location within each of the plurality of consecutive found synchronization slots in the repeating frame.

14. The apparatus as in claim 12 wherein the framing synchronization code $\bar{c}_s$ if in more than one of the synchronization slots are unique per synchronization slot, and wherein the second step of correlating comprises the step of matching the plurality of framing synchronization codes to the location within each synchronization slot.

15. The apparatus as in claim 14 wherein the plurality of framing synchronization codes are mutually orthogonal.

16. The apparatus as in claim 12 wherein the searcher operation further identifies the frame synchronization timing information from a known relative position in the repeating frame with respect to the framing synchronization code $\bar{c}_s$.

17. The apparatus as in claim 12 wherein the pilot code $\bar{c}_p$ and framing synchronization code $\bar{c}_s$ are non-overlapping.

* * * * *

UNITED STATES PATENT AND TRADEMARK OFFICE
CERTIFICATE OF CORRECTION

PATENT NO. : 5,991,330
DATED : November 23, 1999
INVENTOR(S) : Erik Dahlman et al.

It is certified that error appears in the above-identified patent and that said Letters Patent is hereby corrected as shown below:

<u>Title page, Item [54] and Column 1, lines 1-3,</u>
Replace "MOBILE STATION SYNCHRONIZATION WITHIN A SPREAD SPECTRUM COMMUNICATION SYSTEMS" with -- MOBILE STATION SYNCHRONIZATION WITHIN A SPREAD SPECTRUM COMMUNICATION SYSTEM --

Item [56], U.S. PATENT DOCUMENTS, replace
"5,410,568   with --  5,410,568 *
 5,734,648            5,734,648 *
 5,778,316            5,778,316 *
 5,793,757            5,793,757 *
 5,805,583"           5,805,583 * --

<u>Column 3,</u>
Line 9, replace "codes c during each frame." with -- codes $\bar{c}_p$ during each frame --

<u>Column 6,</u>
Line 31, replace "$\bar{c}_{s,01},$" with -- $\bar{c}_{s,o},$ --

<u>Column 7,</u>
Line 16, replace "$(\bar{a},\bar{b})$" with -- $\langle\bar{a},\bar{b}\rangle$ --

Signed and Sealed this

Nineteenth Day of August, 2003

JAMES E. ROGAN
*Director of the United States Patent and Trademark Office*